United States Patent
Guo (10) Patent No.: US 11,756,167 B2
(45) Date of Patent: Sep. 12, 2023

(54) METHOD FOR PROCESSING IMAGE, ELECTRONIC DEVICE AND STORAGE MEDIUM

(71) Applicant: BEIJING XIAOMI MOBILE SOFTWARE CO., LTD., Beijing (CN)

(72) Inventor: Liangqi Guo, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 244 days.

(21) Appl. No.: 17/244,790

(22) Filed: Apr. 29, 2021

(65) Prior Publication Data
US 2022/0036518 A1 Feb. 3, 2022

(30) Foreign Application Priority Data
Jul. 31, 2020 (CN) .......................... 202010764590.0

(51) Int. Cl.
G06T 5/00 (2006.01)
G06T 5/20 (2006.01)
G06T 5/50 (2006.01)

(52) U.S. Cl.
CPC .............. *G06T 5/003* (2013.01); *G06T 5/002* (2013.01); *G06T 5/20* (2013.01); *G06T 5/50* (2013.01); G06T 2207/20024 (2013.01); G06T 2207/20224 (2013.01)

(58) Field of Classification Search
CPC ........... G06T 5/003; G06T 5/002; G06T 5/20; G06T 5/50; G06T 2207/20024; G06T 2207/20224
See application file for complete search history.

(56) References Cited

U.S. PATENT DOCUMENTS

| 7,139,036 B2 | 11/2006 | Wang et al. | |
| 2003/0112374 A1* | 6/2003 | Wang | H04N 5/208 348/625 |
| 2008/0199100 A1* | 8/2008 | Ishiga | G06T 5/20 382/263 |
| 2008/0253678 A1* | 10/2008 | Li | H04N 19/33 382/270 |
| 2010/0022878 A1* | 1/2010 | Azuma | G06T 5/002 600/443 |

(Continued)

FOREIGN PATENT DOCUMENTS

CN 107451978 A * 12/2017 ............. G06T 5/002

OTHER PUBLICATIONS

European Patent Application No. 21171269.0 extended Search and Opinion dated Oct. 22, 2021, 12 pages.

*Primary Examiner* — Oneal R Mistry
*Assistant Examiner* — Vaisali Rao Koppolu
(74) *Attorney, Agent, or Firm* — COZEN O'CONNOR (57) ABSTRACT

An image is obtained. A denoised image is determined by performing denoising processing on the image based on a preset denoising method. At least two frequency information components of the denoised image are obtained by performing filter processing on a preset region image of the denoised image on at least two preset frequency levels. A sharpened image is obtained by performing superposition processing on the denoised image based on at least two frequency information components and a preset adjustment parameter. A target image is determined based on the sharpened image.

14 Claims, 4 Drawing Sheets

(56) References Cited

U.S. PATENT DOCUMENTS

| | | | |
|---|---|---|---|
| 2015/0086126 A1* | 3/2015 | Senzaki | G06T 5/002 |
| | | | 382/263 |
| 2019/0295233 A1* | 9/2019 | Senzaki | H04N 25/60 |
| 2019/0378247 A1* | 12/2019 | Huang | G06T 5/003 |
| 2020/0051215 A1* | 2/2020 | Smirnov | G06T 5/007 |

* cited by examiner

METHOD FOR PROCESSING IMAGE, ELECTRONIC DEVICE AND STORAGE MEDIUM

CROSS REFERENCE TO RELATED APPLICATIONS

This application claims priority and benefits to Chinese Application No. 202010764590.0, filed on Jul. 31, 2020, the entire content of which is incorporated herein by reference.

BACKGROUND

Technologies of increasing image resolution and definition is a last stage of the image processing technology, which significantly affects final presentation of the image.

SUMMARY

The disclosure relates to a field of electronic device technologies, and particularly to a method and an apparatus for processing an image, an electronic device, and a storage medium.

A method for processing an image is provided, which is applied to an electronic device. The method includes: obtaining an image to be processed; performing denoising processing on the image to be processed based on a preset denoising method to determine a denoised image; performing filter processing on a preset region image of the denoised image on at least two preset frequency levels to obtain at least two frequency information components of the denoised image, in which the at least two frequency information components correspond to at least two preset frequency levels respectively; performing superposition processing on the denoised image based on the at least two frequency information components and a preset adjustment parameter, to obtain a sharpened image; and determining a target image based on the sharpened image.

An electronic device is provided. The electronic device includes: a processor; and a memory configured to store instructions executable by the processor. The processor is configured to execute the method for processing an image as described above. The method includes obtaining an image to be processed; performing denoising processing on the image to be processed based on a preset denoising method to determine a denoised image; performing filter processing on a preset region image of the denoised image on at least two preset frequency levels to obtain at least two frequency information components of the denoised image, in which the at least two frequency information components correspond to at least two preset frequency levels respectively; performing superposition processing on the denoised image based on the at least two frequency information components and a preset adjustment parameter, to obtain a sharpened image; and determining a target image based on the sharpened image.

A non-transitory computer readable storage medium is provided. When instructions stored on the storage medium are executed by an electronic device, the electronic device is caused to execute a method for processing an image as described above. The method includes obtaining an image to be processed; performing denoising processing on the image to be processed based on a preset denoising method to determine a denoised image; performing filter processing on a preset region image of the denoised image on at least two preset frequency levels to obtain at least two frequency information components of the denoised image, in which the at least two frequency information components correspond to at least two preset frequency levels respectively; performing superposition processing on the denoised image based on the at least two frequency information components and a preset adjustment parameter, to obtain a sharpened image; and determining a target image based on the sharpened image.

It should be noted that, the details above and in the following are exemplary and illustrative, and do not constitute the limitation on the disclosure.

BRIEF DESCRIPTION OF THE DRAWINGS

The drawings herein are incorporated into the specification and constitute a part of the specification, show embodiments in conformity with embodiments of the disclosure, and explain the principle of the disclosure together with the specification.

DETAILED DESCRIPTION

The example embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the disclosure. Rather, they are merely examples of the apparatus and method consistent with some aspects of the disclosure as detailed in the appended claims.

Technologies of increasing image resolution and definition is a last stage of the image processing technology, which significantly affects final presentation of the image. In the related art, details of the image will be lost while enhancing the image resolution. In addition, while extracting high-frequency information of the image, high-frequency noise will be added to the image, as useful high-frequency information, which causes excessive noise in the processed image and has a negative impact on image quality of the processed image.

In view of details loss, excessive noise, and reduced resolution during the image processing in related arts, the disclosure provides a method for processing an image, which is applied to an electronic device for processing an image. In the method, denoising processing is performed on the image to be processed to obtain a denoised image, prior to performing the sharpening processing. Then, the sharpening processing is performed on the denoised image. Therefore, the method may avoid enhancing the noise during the sharpening processing and effectively control and suppress the noise. During the sharpening processing, multiple frequency information components may be processed separately, which may fully and richly restore details and texture of the image to be processed and enhance the image resolution. Further, a target image with rich details and soft color may be obtained based on the sharpened image. In the method according to the disclosure, the filtering processing is performed on the denoised image on at least two frequency levels and the frequency information components of different frequency levels are optimized and adjusted to obtain the sharpened image, and the target image is obtained based on the sharpened image. Since the frequency information components of different frequency levels are adjusted by adopting corresponding preset adjustment parameters, the detail information and image resolution of the image are enriched, the color of the image is soft, and the image quality of the processed image is improved.

Figure 1:
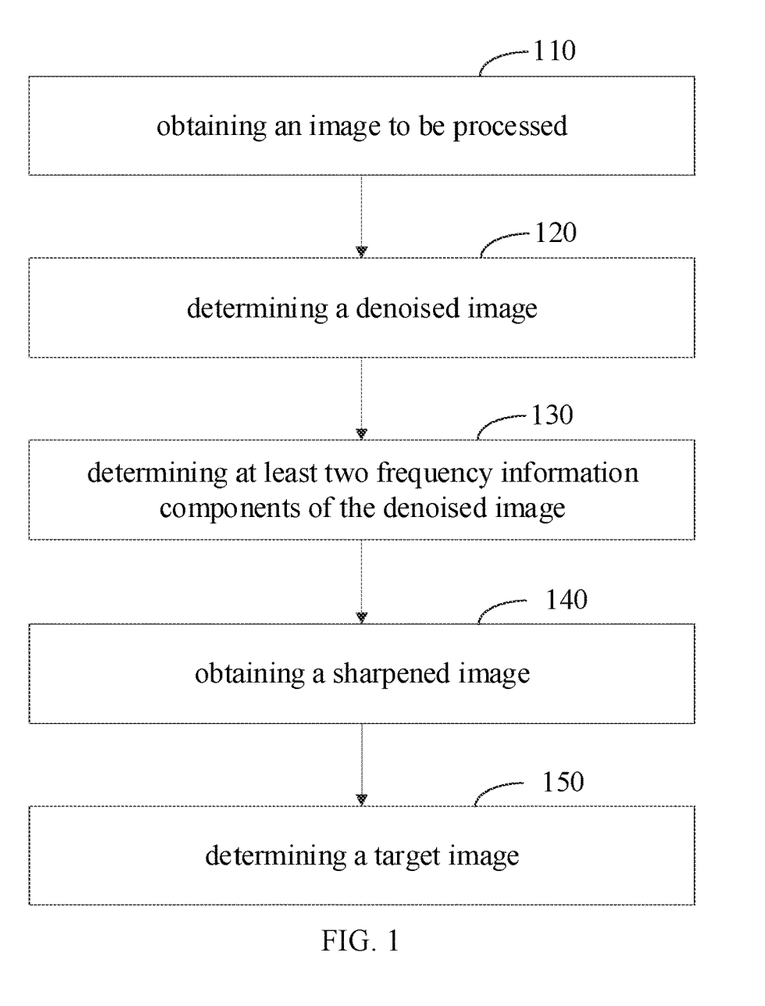
FIG. 1 is a flowchart illustrating a method for processing an image according to some embodiments of the disclosure.

As illustrated in FIG. 1, the method for processing an image may include the following.

At 110, an image to be processed is obtained.

An apparatus for processing an image that is configured to implement the method may obtain the image to be processed from another apparatus. In an example, the apparatus may send a request of obtaining the image to be processed to another apparatus, and another apparatus may respond to the request to send the image to be processed to the apparatus. The apparatus may receive the image to be processed sent from another apparatus. In another example, another apparatus may directly send the image to be processed to the apparatus, and the apparatus may receive the image to be processed. After the apparatus receives the image to be processed, the image to be processed may be processed subsequently.

At 120, a denoised image is obtained by performing denoising processing on the image to be processed based on a preset denoising method.

An objective of the image sharpening is to enhance high-frequency components of the image to be processed. Common methods may include spatial domain image sharpening (or spatial sharpening) and frequency domain image sharpening (or frequency sharpening). The spatial domain image sharpening refers to extracting high-frequency information parameters for identifying image features of the image using a spatial filtering processing technique, adjusting intensity of the high-frequency information parameters, and superimposing the adjusted high-frequency information parameters onto the image to be processed. The frequency domain image sharpening is to transform the image to be processed into a frequency domain image, extract and superimpose high-frequency information within a certain frequency range onto the frequency domain image, and transform the processed frequency domain image to a spatial image. Disadvantages of these two methods may include: it is possible to superimpose high-frequency noise onto the image, as useful high-frequency information, causing amplification and enhancement of the noise and causing a negatively effect on the image quality. Therefore, in order to improve display effect of the processed image, it is necessary to appropriately suppress and control the noise while sharpening the image (or controlling sharpening intensity of the image), to improve the fineness of the edge and details of the image.

In the disclosure, the denoising processing is performed prior to the sharpening processing, to reduce the influence of the noise on the image. The preset denoising method includes at least one of an NLM (non-local means) denoising method, a bilateral filter denoising method, a Gaussian filter denoising method, and a guided filter denoising method.

Different denoising methods may produce different denoising effects on the image. When there are two or more denoising methods, a suitable denoising method may be automatically selected based on their advantages and disadvantages, or the user may directly select a denoising method based on the type of the image to be processed.

In an example, the preset denoising method is the NLM denoising method. The noise of a raw image may be filtered based on the spatial distribution of the image. After the denoising processing, noise information, image detail information, and the denoised image are obtained.

The spatial distribution of the image refers to two-dimensional planar distribution of pixel points of the image, such as a two-dimensional planar distribution of brightness values or pixel values of the pixel points of the image. To perform the denoising processing, the spatial information and the intensity information of the noise information of the image to be processed may be determined, and corresponding image detail information may be obtained or separated from the image to be processed based on the spatial information and intensity information of the noise information. That is, different image detail information may be obtained from the image based on the different spatial positions and intensities of the noise in the image to be processed.

At 130, filter processing is performed on a preset region image of the denoised image on at least two preset frequency levels, to obtain at least two frequency level information components of the denoised image. The at least two frequency information components correspond to the at least two preset frequency levels respectively.

The above image enhancement technology based on a USM (Unsharpen Mask) method is to adjust the sharpening intensity of the while image, but cannot effectively adjust the sharpening intensity for part of the image, and thus flexibility is low. In addition, while enhancing the details of the image, it is possible to excessively enhance the high-frequency information components. As a result, halation may be generated at the edges, which affects the sharpening effect of the image.

In view of this, the method for processing an image according to the disclosure may perform the filter processing on the preset region image of the denoised image on at least two preset frequency levels, and perform the sharpening processing respectively on the at least two frequency information components.

In the image processing technology, the greater the gradient between adjacent pixels of the image, the greater the difference between the adjacent pixels, and the higher the image frequency of a latter pixel compared with that of a former pixel. Thus, the filter processing is performed on the preset region image of the denoised image on at least two preset frequency levels, to obtain the at least two frequency information components respectively corresponding to the at least two frequency levels.

For example, the filter processing is performed on the preset region image of the denoised image on two frequency levels. The two frequency levels are a first frequency level and a second frequency level respectively. The frequency range of the second frequency level is lower than the frequency range of the first frequency level. By performing the filter processing on the denoised image on the two frequency levels, a first frequency information component and a second frequency information component may be obtained.

It should be noted, the first frequency level and the second frequency level may be within the same frequency section, such as one of high frequency section, intermediate and high frequency section, and intermediate frequency section. In addition, the first frequency level and the second frequency level may be within different frequency sections respectively.

The filter processing may be implemented by an existing filter. For example, a high-pass filter may be configured to perform high-frequency filter processing, an intermediate-high-pass filter may be configured to perform intermediate-high-frequency filter processing, and an intermediate-pass filter may be configured to perform intermediate-frequency filter processing.

It is to be noted, a pixel may be represented by a matrix, and brightness value, RGB (red, green, blue) values and other parameters may be included in the matrix. The greater the gradient between two matrices, the higher the difference between frequency values of the positions. In addition, the frequency values of the two adjacent pixels may be determined based on a preset rule. For example, the preset rule includes determining from top to bottom or from left to right on a two-dimensional plane of the image. For example, parameters of two pixels A and B are the same except the brightness value, the pixel A is arranged before the pixel B, and the brightness value of pixel A is greater than that of pixel B. Thus, it may be determined that the frequency value of the pixel B is positive relative to the frequency value of the pixel A and the frequency value of the pixel A is negative relative to the frequency value of the pixel B, based on the preset rule.

The preset region image may include an edge image and/or a detail region image of the denoised image, such that information components representing edges and/or details of the denoised image are obtained by performing the filter processing, and the edges and details of the denoised image may be further optimized. For example, the detail region image is a feature image of a preset ratio of a target object contained in the image. The preset ratio may be adjusted based on image content of the image. In an example, when a landscape image is captured, a picture may be taken on a region that has a size of 1/1000 of the landscape image and contains a target object as the detail region image, such as an image of a tree or a leaf in the landscape image. In this case, the preset ratio is 1:1000, i.e., the whole landscape image is divided into 1000 parts, and one part may be considered as the detail region image. It is to be noted, the value of the preset ratio in the above example is to illustrate the disclosure intuitively, rather than a limitation on the value of the preset ratio.

In some examples, when the image to be processed includes a portrait, a picture may be taken on a region having a size of 1/50 of the image and containing the target object, as the detail region image. The detail region may be a region where for example eyes, teeth, or eyelashes are located, and an image of the detail region is the detail region image.

In some examples, when the image to be processed includes a flower, the preset ratio may be 1:10000. In this case, the detail region is for example a region where stamen and pistil, grain of petal, or shadow of petal is located, and the image of the detail region is the detail region image. Performing the filter processing on the preset region image of the denoised image on at least two preset frequency levels to determine the frequency information components of the denoised image includes: performing the filter processing on the preset region image of the denoised image by adopting at least two of a high-pass filter, an intermediate-high-pass filter and a band-pass filter to obtain at least two of a high-frequency information component, an intermediate-high-frequency information component and an intermediate-frequency information component of the denoised image.

For example, three Laplace filters of different frequency levels may be designed for performing the filter processing on the denoised image, to respectively extract the high-frequency information components, the intermediate-high-frequency information components, and the intermediate-frequency information components of edges and details of the denoised image. Therefore, coverage of multi-frequency-level information components is achieved, and image quality of details and edges of the image are enhanced and improved on different frequency levels.

At 140, superposition processing is performed on the denoised image based on the at least two frequency information components and a preset adjustment parameter, to obtain a sharpened image.

Image resolution enhancement, also called image sharpening, is to make blurred image edges clear and enhance image details. When the camera is out of focus or the camera is zoomed in, the captured image may be blurred to some degree. At this time, it is necessary to compensate outlines of the object contained in the image through the image sharpening to highlight edge information and detail information and make the image clear.

After the at least two frequency information components are determined, each frequency information component may be adjusted separately based on the preset adjustment parameter. Different frequency information components may be adjusted differently, which may not only enhance image display effect, but also effectively control and suppress the noise, thereby improving the image resolution.

The preset adjustment parameter may include at least one of a brightness parameter, a spatial frequency parameter, a brightness contrast parameter, a local histogram parameter, a local pixel method parameter, and a local pixel uniformity parameter. The above different adjustment parameters or a combination thereof may achieve different adjustment effects. When the preset adjustment parameter includes at least two of the above adjustment parameters, suitable adjustment parameters or a combination of the adjustment parameters may be selected based on requirements, to realize corresponding adjustment purposes. The adjustment parameters may also be selected based on a preset algorithm or based on user's requirements, as the preset adjustment parameter. When the preset adjustment parameter includes the brightness parameter, the preset algorithm is, for example, when the noise level of the brightness parameter of the image to be processed or the denoised image is high, the adjustment is performed on the image based on the brightness parameter.

For example, when the at least two frequency information components include the high-frequency information component, in adjusting the high-frequency information component based on the preset adjustment parameter, the adjustment degree of enhancing the high-frequency information component may be reduced appropriately or the high-frequency information component may be not enhanced, to reduce the influence of the high-frequency noise on the image quality, thereby avoid generating edge halation.

The at least two frequency information components may include the high-frequency information component, the intermediate-high-frequency information component, and the intermediate-frequency information component. The preset adjustment parameter may include the brightness parameter, the spatial frequency parameter, and the brightness contrast parameter.

When performing the image processing, the brightness information, the spatial frequency information, and the brightness contrast information of the denoised image in the spatial domain are determined. Frequency information components of multiple frequency levels are comprehensively adjusted based on these three separated dimensions. For example, the high-frequency information component may be basically not enhanced to avoid the edge halation, the intermediate-high-frequency information component may be enhanced appropriately, and the intermediate-frequency component may be enhanced in proportion. The frequency information component on each frequency level is adjusted correspondingly based on the adjustment parameters on multiple dimensions, and thus the control precision is high and the control method is flexible. In addition, details and texture of the image to be processed may be fully restored, the image resolution may be enhanced, and the edge halation may be avoided.

In adjusting the different frequency information components, corresponding enhancement proportions may be set by the user based on requirements, or appropriate proportion may be selected based on the value of gradient between pixels. For example, when the adjustment is performed based on the brightness parameter, the brightness of the image may be adjusted based on the value of brightness gradient between pixels.

At 150, a target image is determined based on the sharpened image.

After the sharpened image is determined, it may be determined whether to perform other processing on the sharpened image or not based on the image quality of the sharpened image. If the image quality of the sharpened image meets a preset requirement, the sharpened image may be directly determined as the target image. If the image quality of the sharpened image does not meet the preset requirement, the sharpened image may be further processed.

For example, when the user specified the image size, the sharpened image may be cropped to obtain a corresponding target image having the size specified by the user.

Image detail information may be obtained while performing the denoising processing on the image to be processed based on the preset denoising method. Determining the target image based on the sharpened image may include: performing the image processing on the sharpened image and the image detail information and further improving details of the sharpened image to obtain a complete target image with noise suppression and enhanced resolution.

It is to be noted, the noise information refers to interference information that affects the overall effect of the image, such as the image information producing an excessively bright region or an excessively dark region of the image, or image information causing some regions of the image blurred. All the above image information may degrade an overall effect of the image and an expression and presentation effect of image details, which may be considered as the noise information. Contrary to the noise information, the image detail information may enhance the expression and presentation effect of the image details and the overall effect of the image. The image detail information is useful image information that is removed along with the noise by performing the denoising processing on the image to be processed. The useful image details may enhance exquisite degree of the image details and are conducive to the expression and presentation effect of the image details. Thus, the useful image details are non-interference information.

In addition, in determining whether image information is the noise or the image detail information, a boundary threshold, such as a brightness threshold or a pixel threshold for the image information, may be used. To perform the denoising processing on the image to be processed, when the brightness of a region of the image to be processed exceeds the brightness threshold, the image information of the region may be determined as the noise information. When the brightness of a region of the image to be processed is within a range corresponding to the brightness threshold, the image information of the region may be determined as the image detail information or information of the sharpened image.

In some examples, both the image detail information and the noise information may be obtained in the denoising processing performed based on the preset denoising method. Determining the target image based on the sharpened image may include performing image fusion processing on the sharpened image based on the noise information and image detail information that are obtained during the denoising processing. That is, the image detail information that is separated from the image to be processed is added back to the sharpened image based on the noise information, to further improve the detail information of the sharpened image and obtain a complete target image with noise suppression and enhanced resolution.

With the method for processing an image, the noise may be suppressed during the image processing through the image denoising and the image fusion, and the details and edges of the image may be further enhanced. The frequency information components of different frequency levels are adjusted by adopting preset adjustment parameters, thereby improving control precision and flexibility of the control method, fully representing details and texture of the image to be processed and enhancing the image resolution. This method may effectively enhance the overall effect of image processing, improving the image quality of the target image, and improving the user experience.

Figure 2:
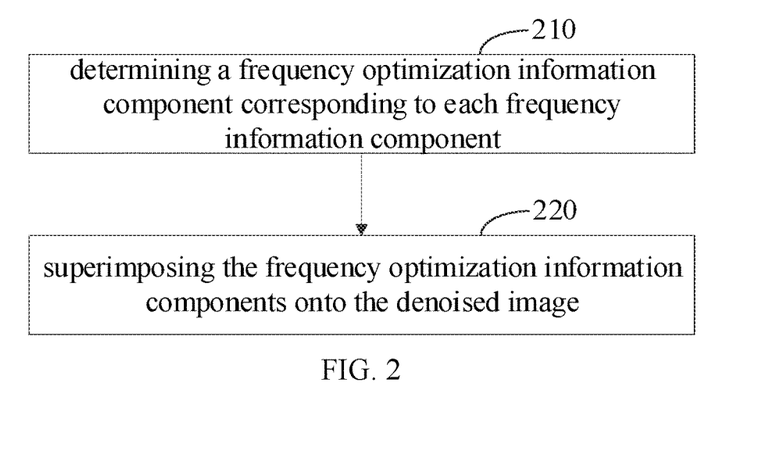
FIG. 2 is a flowchart illustrating a method for processing an image according to some embodiments of the disclosure.

In some examples, as illustrated in FIG. 2, the method for processing an image may further include the following. For example, performing the superposition processing on the denoised image based on the frequency information components and the preset adjustment parameter to obtain the sharpened image may include the following.

At 210, for at least two frequency information components, at least two frequency optimization information components are determined by adjusting, for each frequency information component, a gain parameter contained in the preset adjustment parameter respectively.

Gain parameters contained in different preset adjustment parameters may be adjusted for each frequency information component to determine respective frequency optimization information components of the preset adjustment parameters corresponding to the frequency information component.

The at least two frequency information components may include for example a high-frequency information component, an intermediate-high-frequency information component, and an intermediate-frequency information component. The preset adjustment parameter may include for example a brightness parameter, a spatial frequency parameter, and a brightness contrast parameter.

In the method for processing an image, the gain parameter of the brightness parameter of the high-frequency information component, the gain parameter of the spatial frequency parameter of the high-frequency information component, the gain parameter of the brightness contrast parameter of the high-frequency information component, the gain parameter of the brightness parameter of the intermediate-high-frequency information component, the gain parameter of the spatial frequency parameter of the intermediate-high-frequency information component, the gain parameter of the brightness contrast parameter of the intermediate-high-frequency information component, the gain parameter of the brightness parameter of the intermediate-frequency information component, the gain parameter of the spatial frequency parameter of the intermediate-frequency information component, and the gain parameter of the brightness contrast parameter of the intermediate-frequency information component are adjusted respectively, to determine a high-frequency optimization information component corresponding to the brightness parameter of the high-frequency information component, a high-frequency optimization information component corresponding to the spatial frequency parameter of the high-frequency information component, a high-frequency optimization information component corresponding to the brightness contrast parameter of the high-frequency information component, an intermediate-high-frequency optimization information component corresponding to the brightness parameter of the intermediate-high-frequency information component, an intermediate-high-frequency optimization information component corresponding to the spatial frequency parameter of the intermediate-high-frequency information component, an intermediate-high-frequency optimization information component corresponding to the brightness contrast parameter of the intermediate-high-frequency information component, an intermediate-frequency optimization information component corresponding to the brightness parameter of the intermediate-frequency information component, an intermediate-frequency optimization information component corresponding to the spatial frequency parameter of the intermediate-frequency information component, and an intermediate-frequency optimization information component corresponding to the brightness contrast parameter of the intermediate-frequency information component.

For the same adjustment parameter, optimization components corresponding to different frequency information components are different. For example, for the brightness parameter, a ratio of the high-frequency optimization information component to the high-frequency information component is minimum, and a ratio of the intermediate-frequency optimization information component to the intermediate-frequency information component is maximum. That is, the adjustment degree for the high-frequency information component is the minimum, and the adjustment degree for the intermediate-frequency information component is the maximum. In this way, the image details may be enhanced and the edge halation may be avoided.

At 220, the at least two frequency optimization information components are superimposed onto the denoised image, to obtain the sharpened image.

After the frequency optimization information component corresponding to each frequency information component is determined, the frequency optimization information component is superimposed onto the denoised image. After the superposition processing, the sharpened image with edge enhancement and clear details may be obtained. The method of performing the superposition method may refer to those in the related art, which is not repeated here.

Figure 3:
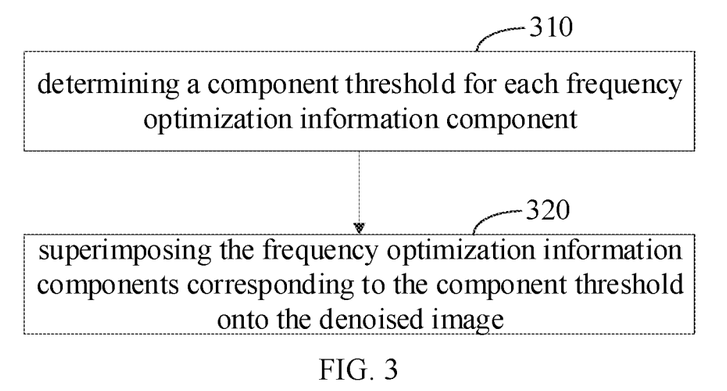
FIG. 3 is a flowchart illustrating a method for processing an image according to some embodiments of the disclosure.

In some examples, as illustrated in FIG. 3, the method for processing an image may include the following. For example, superimposing the frequency optimization information components onto the denoised image to obtain sharpened image may include the following.

At 310, a component threshold corresponding to each frequency optimization information component is determined.

Different component thresholds may be set for different frequency optimization information components. Different frequency optimization information components correspond to different frequency levels and different adjustment parameters. The component thresholds may be set separately for different frequency levels. Further, the component thresholds may be set separately for different adjustment parameters of the same frequency level. Further, a percent of the information component to be superimposed may be determined based on dynamic component thresholds when performing the superimposition processing, to avoid superimposing excessive optimization information component in the superimposition processing and avoid edge halation caused by excessive enhancing the image. The dynamic component thresholds refer to different adjustment thresholds set for different frequency levels and different adjustment parameters.

For example, when at least two frequency optimization information components include an intermediate-frequency optimization information component corresponding to the brightness parameter of the intermediate-frequency information component, an intermediate-frequency optimization information component corresponding to the spatial frequency parameter of the intermediate-frequency information component, and an intermediate-frequency optimization information component corresponding to the brightness contrast parameter of the intermediate-frequency information component, the component thresholds corresponding to the intermediate-frequency optimization information component may include the adjustment thresholds of the three adjustment parameters, i.e., the brightness parameter, the spatial frequency parameter and the brightness contrast parameter. Superimposition of the intermediate-frequency optimization information component onto the image may be controlled by the adjustment thresholds contained in the above component thresholds, to achieve refined image processing and flexible control.

At 320, the frequency optimization information components corresponding to a component threshold are superimposed sequentially onto the denoised image within a range specified by the component threshold to determine the sharpened image.

When the at least two frequency optimization information components are superimposed onto the denoised image, the component threshold is used to determine an upper limit of each frequency optimization information component to be superimposed. That is, when a frequency optimization information component is less than or equal to the component threshold, an entirety of the frequency optimization information component is superimposed onto the denoised image. When a frequency optimization information component is greater than the component threshold, a part of the frequency optimization information component that corresponds to the component threshold is superimposed onto the denoised image. By setting the component threshold, superimposing excessive part of the frequency optimization information component may be avoided in the superimposition processing and the edge halation effect caused by excessively enhancing the image may be avoided. The sharpened image with edge enhancement and clear details may be obtained by adopting the method for processing an image.

For example, taking the brightness parameter as an example, the brightness value of pixel A in the denoised image is 50, the frequency optimization information component on the dimension of brightness parameter corresponding to the pixel A is 15, and the component threshold of the dimension of brightness parameter corresponding to the pixel A is 10. In this case, the brightness value of pixel A in the sharpened image is 50+10=60.

Further, taking the brightness parameter as an example as well, the brightness value of pixel B in the denoised image is 50, the frequency optimization information component on the dimension of brightness parameter corresponding to the pixel B is 5, and the component threshold value on the dimension of brightness parameter corresponding to the pixel B is 10. In this case, the brightness value of pixel B in the sharpened image is 50+5=55.

It is to be noted, the component threshold may be a positive value or a negative value. However, when adding or subtracting the frequency optimization information component based on the pixel of the denoised image, the value of the optimization information component shall not exceed its corresponding positive component threshold or negative component threshold.

In some examples, the method for processing an image may further include: determining a differential image based on the image to be processed and the denoised image; and performing the image processing based on the sharpened image, the noise information, and the differential image, to determine the target image.

In some examples, the differential image is obtained by subtracting a pixel value of each pixel in the denoised image from a pixel value of a corresponding pixel in the image to be processed. The differential image may contain image detail information. The image processing (such as the image fusion processing) is performed on the sharpened image and the image detail information, and detail information of the sharpened image is further improved to obtain the complete target image with noise suppression and enhanced resolution.

In some examples, the differential image may include image detail information and noise information. The noise information may include noise location information and noise intensity information. For performing the denoising processing, the noise location information and the noise intensity information are determined, and then the differential image is obtained or separated from the image to be processed based on the noise location information and the noise intensity information. Further, the noise information containing the noise location information and the noise intensity information is also obtained for subsequent use. For the subsequent image fusion processing, the differential image and the sharpened image are fused based on the noise location information and the noise intensity information contained in the noise information that is extracted during the denoising processing, to upgrade expression effect of the image details.

In subsequently fusing the differential image and the sharpened image, the image detail information and the noise information are processed differently. The image detail information may enhance presentation and expression effect of the image details. That is, the image detail information is non-interference information. The noise information is interference information. That is, the noise information degrades exquisite degree of the image. Since the noise location information and the noise intensity information are determined in the denoising processing of the image to be processed, and the differential image includes both the noise information and the image detail information, it may be clearly determined which part is the noise information and which part is the image detail information in the image fusion processing. Therefore, for fusing the differential image and the sharpened image, it may be determined whether the information to be fused is the interference information or the image detail information based on the noise location information. When the information to be fused is the image detail information, different fusion methods may be adopted based on the frequency levels of the image details. For example, when a part of the image detail information belongs to the high-frequency level, the optimization information component of this part may be decreased to make the image details more exquisite and avoid some details being highlighted in fusing this part of image detail information. When a part of the image detail information belongs to the low-frequency level, the optimization information component of this part may be increased to avoid this part being excessively dim relative to other details in fusing this part of image detail information.

For the interference information (i.e., the noise information), since the noise location information and the noise intensity information of the noise information have been known, different fusion strategies may be adopted based on different noise intensities. For example, when the intensity of the noise information within a certain region is relatively high, for example, the region is too bright due to the influence of external light when taking photos, in the image fusion processing, this noise information may not be fused to avoid affecting the presentation and expression effect of the image details. When the intensity of the noise information within a certain region is relatively low, for example, the certain region of the image is slighted blurred but also contains some image details, this noise information may be optimized and fused with the sharpened image to further improve the exquisite degree of the image detail in the image fusion processing.

In some examples, the NLM denoising method may be adopted to perform the denoising processing on the image to be processed, and the differential image separated from the image to be processed may include some subtle detail information and edge information that are lost in the denoising processing. Based on the noise location information and the noise intensity information, the differential image may be added back to the sharpened image to further upgrade the presentation and expression effect of the image details.

Figure 4:
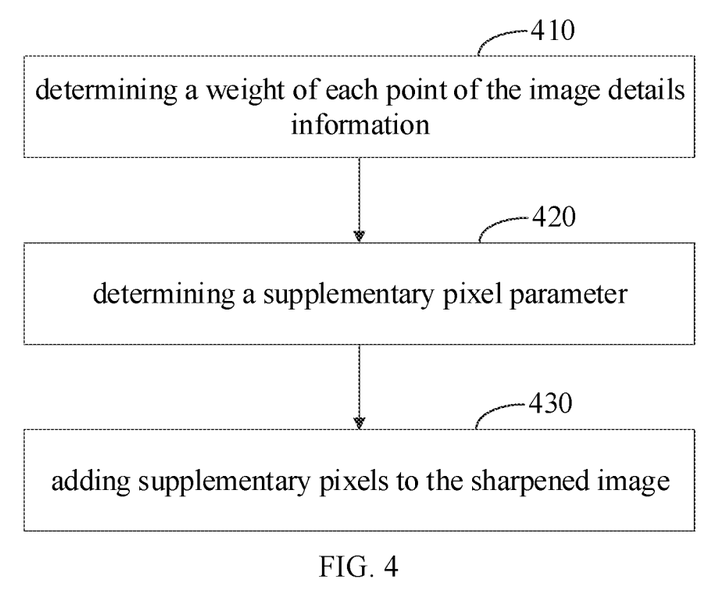
FIG. 4 is a flowchart illustrating a method for processing an image according to some embodiments of the disclosure.

In some examples, as illustrated in FIG. 4, the method for processing an image may further include the following.

At 410, a weight of each pixel in the image detail information is determined.

The weight of each pixel refers to an importance degree of the pixel on the image. Generally, the greater the absolute value of the weight of the pixel is, the greater its influence on the image is, and the greater the influence of adjusting the pixel on the image is. Therefore, by determining the weight of each pixel in the image detail information, the influence of the pixel in the image detail information on the image to be processed may be determined, so as to facilitate the subsequent image fusion processing and improve the image quality of the target image.

At 420, a supplementary pixel parameter is determined based on a pixel parameter of each pixel in the image detail information and the weight of the pixel.

For example, the image detail information may be added back to the sharpened image by weighting the image detail information pixel by pixel, to further upgrade the presentation and expression effect of the image details.

For a pixel with a high weight, more supplementary pixels may be set appropriately. For a pixel with a low weight, fewer supplementary pixels may be set appropriately.

In some examples, the weight of a pixel C in the image detail information is 20, and the weight of a pixel D in the image detail information is 30, which indicates that the pixel D affects the image quality to a larger extend than the pixel C. The number of pixels D that are added to the sharpened image is larger than the number of pixels C. In this case, the supplementary pixel parameter of the pixel C may be 10, and the supplementary pixel parameter of the pixel D may be 20. That is, 10 pixels C are supplemented to corresponding pixel locations of the sharpened image, and 20 pixels D are supplemented to corresponding pixel locations of the sharpened image to improve the image quality of the final image.

It is to be noted, the above example is only to illustrate the correspondence between the supplementary pixel parameter and the weight. The supplementary pixel parameter may not refer to the number of pixels to be added or supplemented. In some examples, the supplementary pixel parameter may refer to other parameters that indicates the number of supplementary pixels.

At 430, supplementary pixels are superimposed onto the sharpened image based on the supplementary pixel parameter to obtain the target image.

In the denoising processing, a part of image detail information of the image to be processed may be removed. The loss of the part of image detail information may inevitably affect the effect of the image processing. In order to reduce the influence of the removed part of image detail information on the effect of the image processing when performing the denoising processing, the image detail information may be superimposed onto the sharpened image.

Since the lost image detail information is separated from the image along with the noise, the image detail information may be supplemented back to the sharpened image based on the noise information.

In some examples, the noise information includes the noise location information and the noise intensity information. For performing the image fusion, based on the noise location information and the noise intensity information, the supplementary pixels may be added back to the sharpened image to obtain the final target image, to further upgrade the presentation and expression effect of the image details and upgrade the image quality.

In some examples, the method for processing an image may include the following. The denoising processing is performed on the image to be processed. The differential image with the image detail information is separated from the image to be processed. The noise information containing the noise location information and the noise intensity information is determined. The high-frequency information component, the intermediate-high-frequency information component, and the intermediate-frequency information component of the denoised image are obtained through three filters of different frequency levels. The brightness parameter, the spatial frequency parameter, and the brightness contrast parameter of the denoised image are statistically analyzed. The information components of different frequency levels are adjusted based on the above three parameter dimensions, to effectively avoid edge halation effect caused by excessive enhancement of the high-frequency information component of the denoised image. The adjusted optimization information components of different frequency levels are superimposed onto the denoised image to obtain an initial sharpened image. The differential image and the initial sharpened image are fused pixel by pixel based on the noise location information and the noise intensity information that are determined in the denoising processing, to finally obtain the complete target image with noise suppression and enhanced resolution.

Figure 5:
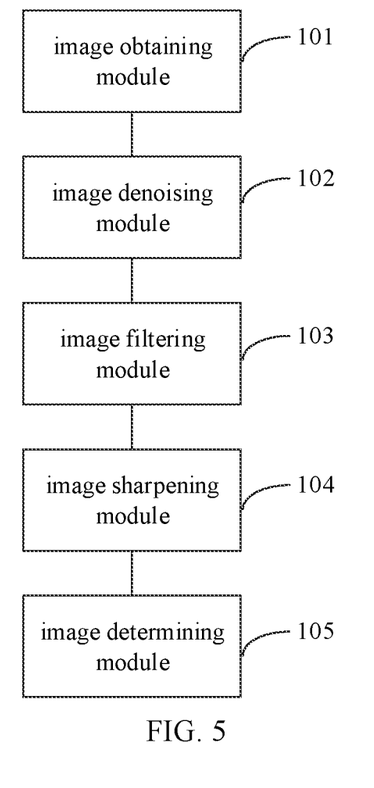
FIG. 5 is a block diagram illustrating an apparatus for processing an image according to some embodiments of the disclosure.

In some embodiments, an apparatus for processing an image is provided. As illustrated in FIG. 1 and FIG. 5, the apparatus may include an image obtaining module 101, an image denoising module 102, an image filtering module 103, an image sharpening module 104 and an image determining module 105. The apparatus may be configured to implement the above method.

The image obtaining module 101 is configured to obtain an image to be processed.

The image denoising module 102 is configured to perform denoising processing on the image to be processed based on a preset denoising method to determine a denoised image.

The preset denoising method may include at least one of a NLM (non-local means) denoising method, a bilateral filter denoising method, a Gaussian filter denoising method, and a guided filter denoising method.

The image filtering module 103 is configured to perform filter processing on a preset REGION image of the denoised image on at least two preset frequency levels to obtain at least two frequency information components of the denoised image. the at least two frequency information components correspond to at least two preset frequency levels respectively.

The image filtering module 103 is configured to perform the filter processing on the preset region image of the denoised image by using at least two of a high-pass filter, an intermediate-high-pass filter and a band-pass filter, to obtain the at least two of a high-frequency information component, an intermediate-high-frequency information component and an intermediate-frequency information component of the denoised image.

The preset region image may include an edge image and/or a detail region image of the denoised image.

The image sharpening module 104 is configured to perform superposition processing on the denoised image based on at least two frequency information components and a preset adjustment parameter, to obtain a sharpened image. The preset adjustment parameter may includes at least one of a brightness parameter, a spatial frequency parameter, a brightness contrast parameter, a local histogram parameter, a local pixel method parameter, and a local pixel uniformity parameter.

The image determining module 105 is configured to determine a target image based on the sharpened image.

As illustrated in FIG. 2 and FIG. 5, the image sharpening module 104 is configured to for each of the at least two frequency information components, adjust a gain parameter contained in the preset adjustment parameter and corresponding to the frequency information component respectively, to determine at least two frequency optimization information components; and superimpose the at least two frequency optimization information components onto the denoised image to obtain the sharpened image.

The image sharpening module 104 is further configured to: determine a component threshold corresponding to each frequency optimization information component; and superimpose the frequency optimization information components corresponding to the component threshold sequentially onto the denoised image within the component threshold to determine the sharpened image.

As illustrated in FIG. 5, the image denoising module 102 is further configured to determine image detail information based on the image to be processed and the denoised image. Further, the image denoising module 102 is further configured to obtain the differential image by subtracting pixel values of pixels in the denoised image from pixel values corresponding pixels in the image to be processed. The differential image contains image detail information.

The image determining module 105 is further configured to perform the image processing based on the sharpened image and the image detail information to determine the target image.

As illustrated in FIG. 4 and FIG. 5, the image determining module 105 is further configured to: determine a weight of each pixel in the image detail information; determine a supplementary pixel parameter according to a pixel parameter of each pixel in the image detail information and the weight corresponding to the pixel; and superimpose supplementary pixels onto the sharpened image according to the supplementary pixel parameter to obtain the target image.

Figure 6:
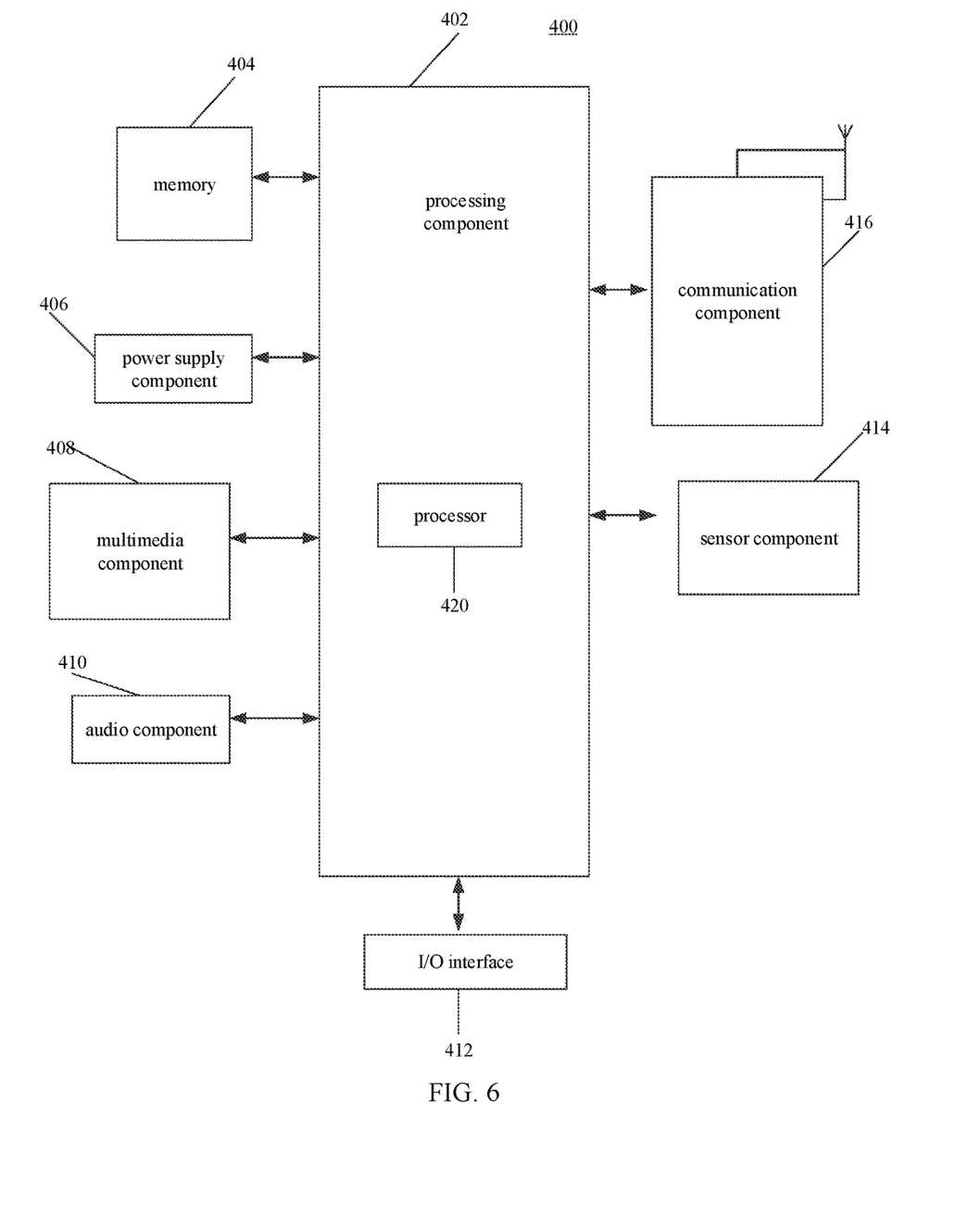
FIG. 6 is a block diagram illustrating an electronic device according to some embodiments of the disclosure.

In some embodiments, As illustrated in FIG. 6, an electronic device is provided. For example, the electronic device 400 may be a mobile phone, a computer, a tablet device, a camera, a video camera, and other devices for image processing.

The electronic device 400 may include one or more components: a processing component 402, a memory 404, a power supply component 406, a multimedia component 408, an audio component 410, an input/output (I/O) interface 412, a sensor component 414, and a communication component 416.

The processing component 402 generally controls the whole operation of the device 400, such as the operations related to display, phone call, data communication, camera operation and recording operation. The processing component 402 may include one or more processors 420 to perform instructions, to complete all or part of blocks of the above method for image shooting or the above method for image processing. In addition, the processing component 402 may include one or more modules for the convenience of interaction between the processing component 402 and other components. For example, the processing component 402 may include a multimedia module for the convenience of interaction between the multimedia component 408 and the processing component 402.

The memory 404 is configured to store all types of data to support the operation of the apparatus 400. Examples of the data include the instructions of any applications or methods operated on device 400, contact data, phone book data, messages, pictures, videos, etc. The memory 404 may be implemented by any type of volatile or non-volatile storage devices or their combination, such as static random-access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

The power supply component 406 may provide power for all components of the device 400. The power supply component 406 may include power supply management system, a or more power supplies, and other units related to generating, managing, and distributing power for the device 400.

The multimedia component 408 includes an output interface screen provided between the device 400 and the user. In some embodiments, a screen may include a liquid crystal display (LCD) and a touch panel (TP). If the screen includes a touch panel, the screen may be implemented as a touch screen to receive input signals from the user. The touch panel includes one or more touch sensors to sense touching, sliding and gestures on the touch panel. The touch sensor may not only sense the boundary of touch or slide action, but also detect the duration and pressure related to the touching or sliding operation. In some embodiments, the multimedia component 408 include a front camera and/or a rear camera. When the electronic device 400 is in operation mode, such as shooting mode or video mode, the front camera or the rear camera may receive the external multimedia data. Each front camera and rear camera may be a fixed optical lens system or an optical lens system with focal length and optical zoom capacity.

The audio component 410 is configured as output and/or input signal. For example, the audio component 410 includes a microphone (MIC). When the device 400 is in operation mode, such as call mode, record mode, and speech recognition mode, the microphone is configured to receive the external audio signals. The audio signals received may be further stored in the memory 404 or sent via the communication component 416. In some embodiments, the audio component 410 further includes a speaker configured to an output audio signal.

The I/O interface 412 provides an interface for the processing component 402 and the peripheral interface module, and the peripheral interface module may be a keyboard, a click wheel, a button, etc. The buttons may include but not limited to a home button, a volume button, a start button and a lock button.

The sensor component 414 includes one or more sensors, configured to provide various aspects of status assessment for the electronic device 400. For example, the sensor component 414 may detect the on/off state of the electronic device 400 and the relative positioning of the component. For example, the component is a display and a keypad of the electronic device 400. The sensor component 414 may further detect the location change of the electronic device 400 or one component of the electronic device 400, the presence or absence of contact between the user and the device 400, the orientation or acceleration/deceleration of the device 400, and the temperature change of the device 400. The sensor component 414 may include a proximity sensor, which is configured to detect the existence of the objects nearby without any physical contact. The sensor component 414 may further include a light sensor such as CMOS or CCD image sensor, which is configured to use in imaging applications. In some embodiments, the sensor component 414 may further include an acceleration transducer, a gyroscope sensor, a magnetic sensor, a pressure sensor or a temperature sensor.

The communication component 416 is configured for the convenience of wire or wireless communication between the device 400 and other devices. The device 700 may access wireless networks based on communication standard, such as WiFi, 2G or 3G, or their combination. In an exemplary embodiment, the communication component 416 receives broadcast signals or broadcast-related information from an external broadcast management system via a broadcast channel. In an exemplary embodiment, the communication component 416 further includes a near field communication (NFC) module to facilitate short-range communication. For example, an NFC module may be implemented based on radio frequency identification (RFID) technology, infrared data association (IRDA) technology, ultra-wideband (UWB) technology, bluetooth (BT) technology and other technologies.

In an exemplary embodiment, the electronic device 400 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above method.

In an exemplary embodiment, a non-transitory computer readable storage medium is further provided which includes instructions, such as the memory 404 including instructions, in which the instructions may be executed by the processor 420 of the device 400 to complete the above methods. For example, the non-temporary computer readable storage medium may be a ROM, a random-access memory (RAM), a CD-ROM, a magnetic tape, a floppy disk, an optical data storage device, etc. An electronic device may execute a method for processing an image as described above when the instructions of the storage medium are executed by the processor of an electronic device.

After considering the specification and practicing the disclosure herein, those skilled in the art will easily think of other implementations. The disclosure is intended to cover any variations, usages, or adaptive changes of the disclosure. These variations, usages, or adaptive changes follow the general principles of the disclosure and include common knowledge or conventional technical means in the technical field not disclosed by the disclosure. The description and the embodiments are to be regarded as exemplary only, and the true scope and spirit of the disclosure are given by the appended claims.

It should be understood, the disclosure is not limited to the precise structure described above and shown in the drawings, and various modifications and changes may be made without departing from its scope. The scope of the disclosure is only limited by the appended claims.

What is claimed is:

1. A method for processing an image, applied to an electronic device, comprising:
    obtaining an image;
    determining a denoised image by performing denoising processing on the image based on a preset denoising method;
    obtaining at least two frequency information components of the denoised image by performing filter processing on a preset region image of the denoised image on at least two preset frequency levels, wherein the at least two frequency information components correspond to at least two preset frequency levels respectively;
    obtaining a sharpened image by performing superposition processing on the denoised image based on the at least two frequency information components and a preset adjustment parameter; and
    determining a target image based on the sharpened image;
    wherein the method further comprises:
    determining a differential image, wherein the differential image is obtained by subtracting a respective pixel value of each pixel in the denoised image from a pixel value of a corresponding pixel in the image, wherein the differential image comprises image detail information and noise information and the noise information comprises noise location information and noise intensity information;
    separating the image detail information from the noise information in the differential image based on the noise location information;
    determining a respective weight of each pixel in the image detail information;
    determining a respective supplementary pixel parameter based on a respective pixel parameter of each pixel in the image detail information and the weight corresponding to the pixel; and
    obtaining the target image by superimposing supplementary pixels onto the sharpened image based on the supplementary pixel parameter.

2. The method of claim 1, wherein obtaining the at least two frequency information components of the denoised image comprises:
    obtaining at least two of a high-frequency information component, an intermediate-high-frequency information component, and an intermediate-frequency information component of the denoised image by performing the filter processing on the preset region image of the denoised image using at least two of a high-pass filter, an intermediate-high-pass filter, and a band-pass filter, wherein the at least two information components correspond to the at least two filters respectively.

3. The method of claim 1, wherein, the preset region image comprises an edge image and/or a detail region image of the denoised image.

4. The method of claim 1, wherein obtaining the sharpened image comprises:
    for each of the at least two frequency information components, adjusting a gain parameter contained in the preset adjustment parameter and corresponding to the frequency information component, to determine at least two frequency optimization information components corresponding to the at least two frequency information components; and
    obtaining the sharpened image by superimposing the at least two frequency optimization information components onto the denoised image.

5. The method of claim 4, wherein obtaining the sharpened image by superimposing the at least two frequency optimization information components onto the denoised image comprises:
    determining a component threshold corresponding to each frequency optimization information component; and
    determining the sharpened image by superimposing frequency optimization information components corresponding to the component threshold sequentially onto the denoised image within the component threshold.

6. The method of claim 1, wherein, the preset adjustment parameter comprises at least one of a brightness parameter, a spatial frequency parameter, a brightness contrast parameter, a local histogram parameter, a local pixel method parameter, and a local pixel uniformity parameter.

7. An electronic device, comprising:
    a processor;
    a memory, configured to store instructions executable by the processor;
    wherein, the processor is configured to:
    obtain an image;
    determine a denoised image by performing denoising processing on the image based on a preset denoising method;
    obtain at least two frequency information components of the denoised image by performing filter processing on a preset region image of the denoised image on at least two preset frequency levels, wherein the at least two frequency information components correspond to at least two preset frequency levels respectively;
    obtain a sharpened image by performing superposition processing on the denoised image based on the at least two frequency information components and a preset adjustment parameter; and
    determine a target image based on the sharpened image;
    wherein the processor is further configured to:
    determining a differential image by subtracting a respective pixel value of each pixel in the denoised image from a pixel value of a corresponding pixel in the image, wherein the differential image comprises image detail information and noise information and the noise information comprises noise location information and noise intensity information;

separating the image detail information from the noise information in the differential image based on the noise location information;

determining a respective weight of each pixel in the image detail information;

determining a respective supplementary pixel parameter based on a respective pixel parameter of each pixel in the image detail information and the weight corresponding to the pixel; and obtaining the target image by superimposing supplementary pixels onto the sharpened image based on the supplementary pixel parameter.

8. The electronic device of claim 7, wherein the processor is further configured to:

obtain at least two of a high-frequency information component, an intermediate-high-frequency information component, and an intermediate-frequency information component of the denoised image by performing the filter processing on the preset region image of the denoised image using at least two of a high-pass filter, an intermediate-high-pass filter, and a band-pass filter, wherein the at least two information components correspond to the at least two filters respectively.

9. The electronic device of claim 7, wherein, the preset region image comprises an edge image and/or a detail region image of the denoised image.

10. The electronic device of claim 7, wherein the processor is further configured to:

for each of the at least two frequency information components, adjust a gain parameter contained in the preset adjustment parameter and corresponding to the frequency information component, to determine at least two frequency optimization information components corresponding to the at least two frequency information components; and obtain the sharpened image by superimposing the at least two frequency optimization information components onto the denoised image.

11. The electronic device of claim 10, wherein the processor is further configured to:

determine a component threshold corresponding to each frequency optimization information component; and determine the sharpened image by superimposing frequency optimization information components corresponding to the component threshold sequentially onto the denoised image within the component threshold.

12. The electronic device of claim 7, wherein the preset adjustment parameter comprises at least one of a brightness parameter, a spatial frequency parameter, a brightness contrast parameter, a local histogram parameter, a local pixel method parameter, and a local pixel uniformity parameter.

13. A non-transitory computer readable storage medium, wherein when instructions stored on the storage medium are executed by an electronic device, the electronic device is caused to execute a method for processing an image, the method comprising:

obtaining an image;

determining a denoised image by performing denoising processing on the image based on a preset denoising method;

obtaining at least two frequency information components of the denoised image by performing filter processing on a preset region image of the denoised image on at least two preset frequency levels, wherein the at least two frequency information components correspond to at least two preset frequency levels respectively;

obtaining a sharpened image by performing superposition processing on the denoised image based on the at least two frequency information components and a preset adjustment parameter; and determining a target image based on the sharpened image; wherein the method further comprises:

determining a differential image by subtracting a respective pixel value of each pixel in the denoised image from a pixel value of a corresponding pixel in the image, wherein the differential image comprises image detail information and noise information and the noise information comprises noise location information and noise intensity information;

separating the image detail information from the noise information in the differential image based on the noise location information;

determining a respective weight of each pixel in the image detail information;

determining a respective supplementary pixel parameter based on a respective pixel parameter of each pixel in the image detail information and the weight corresponding to the pixel; and obtaining the target image by superimposing supplementary pixels onto the sharpened image based on the supplementary pixel parameter.

14. The non-transitory computer readable storage medium of claim 13, wherein obtaining the at least two frequency information components of the denoised image comprises:

obtaining at least two of a high-frequency information component, an intermediate-high-frequency information component, and an intermediate-frequency information component of the denoised image by performing the filter processing on the preset region image of the denoised image using at least two of a high-pass filter, an intermediate-high-pass filter, and a band-pass filter, wherein the at least two information components correspond to the at least two filters respectively.

* * * * *